(12) United States Patent
Lee

(10) Patent No.: US 12,520,395 B2
(45) Date of Patent: Jan. 6, 2026

(54) CONTROL SYSTEM HAVING LIGHTING FUNCTION AND PLASMA GENERATION FUNCTION

(71) Applicant: VALKIDA CO., LTD., Anyang-si (KR)

(72) Inventor: Jae Sung Lee, Anyang-si (KR)

(73) Assignee: VALKIDA CO., LTD., Anyang-si (KR)

( * ) Notice: Subject to any disclaimer, the term of this patent is extended or adjusted under 35 U.S.C. 154(b) by 0 days.

(21) Appl. No.: 18/575,810

(22) PCT Filed: Jan. 27, 2023

(86) PCT No.: PCT/KR2023/001282
§ 371 (c)(1),
(2) Date: Dec. 29, 2023

(87) PCT Pub. No.: WO2024/154849
PCT Pub. Date: Jul. 25, 2024

(65) Prior Publication Data
US 2025/0098047 A1  Mar. 20, 2025

(30) Foreign Application Priority Data

Jan. 17, 2023 (KR) .................. 10-2023-0006773

(51) Int. Cl.
*H05B 45/37* (2020.01)
*H05B 45/10* (2020.01)
(Continued)

(52) U.S. Cl.
CPC ........... *H05B 45/325* (2020.01); *H05B 45/10* (2020.01); *H05B 45/375* (2020.01); *H05H 1/47* (2021.05); *H05H 2245/36* (2021.05)

(58) Field of Classification Search
CPC ........ H05B 41/24; H05B 41/26; H05B 45/37; H05B 45/325; H05B 45/375;
(Continued)

(56) References Cited

U.S. PATENT DOCUMENTS

2004/0100205 A1* 5/2004 Takahashi .......... H05B 41/3924
                                                    315/291
2004/0135523 A1* 7/2004 Takahashi .......... H05B 41/2806
                                                    315/307
(Continued)

FOREIGN PATENT DOCUMENTS

KR    20190114920 A  * 10/2019  ........ H01J 37/32174

*Primary Examiner* — Thai Pham
(74) *Attorney, Agent, or Firm* — Maschoff Brennan

(57) ABSTRACT

Disclosed is a control system having a lighting function and a plasma generation function, including: a power conversion unit configured to convert an AC power into a DC power; a lighting control unit configured to control turning on and off of an LED lighting lamp; a photocoupler unit including a first photocoupler electrically connected to the power conversion unit and the lighting control unit, and a second photocoupler electrically connected to the power conversion unit to detect a full-wave rectified DC power; an oscillation frequency generation unit electrically connected to the second photocoupler; a plasma electrode configured to receive an amplified high voltage to generate plasma; and a high voltage supply unit electrically connected to receive the oscillation frequency to induce a high voltage, and amplify the induced high voltage to supply the induced high voltage to the plasma electrode.

8 Claims, 4 Drawing Sheets

(51) Int. Cl.
  *H05B 45/325* (2020.01)
  *H05B 45/375* (2020.01)
  *H05H 1/24* (2006.01)
  *H05H 1/46* (2006.01)

(58) Field of Classification Search
  CPC .......... H05B 45/382; H05H 1/46; H05H 1/47;
  H05H 2245/00; H05H 2245/36
  See application file for complete search history.

(56) References Cited

U.S. PATENT DOCUMENTS

2015/0108898 A1* 4/2015 Cheung .................... H05H 1/30
  315/111.51
2016/0339261 A1* 11/2016 Mletzko ................... H05H 1/46
2019/0104583 A1* 4/2019 Konishi ............... H05B 45/382

* cited by examiner

CONTROL SYSTEM HAVING LIGHTING FUNCTION AND PLASMA GENERATION FUNCTION

TECHNICAL FIELD

The present invention relates to a control system having a lighting function and a plasma generation function, and more particularly, to a control system having a lighting function and a plasma generation function through individual control.

BACKGROUND ART

The contents described in this background art section are provided to improve understanding of the background of the invention, and may include contents that are not the related art already known to a person having ordinary skill in the art to which this technology pertains.

A control system having a lighting function and a plasma generation function will be briefly reviewed as follows.

FIG. 1 shows a control system having a lighting function and a plasma generation function according to an individual control scheme according to the related art.

Referring to FIG. 1, when an alternating current is input, a switch S1 may be closed to allow the current to flow through an LED converter 10 so that an LED lighting lamp 1 may be turned on, and the switch S1 may be opened to allow the current not to flow through the LED converter 10 so that the LED lighting lamp 1 may be turned off.

In addition, when the alternating current is input, a switch S2 may be closed to allow the current to flow through a plasma generator 20 so that plasma may be generated from a plasma nozzle 30, and the switch S2 may be opened to allow the current not to flow through the plasma generator 20 so that plasma may not be generated from the plasma nozzle 30.

FIG. 2 shows a control system having a lighting function and a plasma generation function according to a mounting scheme according to the related art.

Referring to FIG. 2, when an alternating current is input, a switch S may be closed to allow the current to flow through an integrated LED converter-plasma generator 40 so that plasma may be generated from a plasma nozzle 30 while an LED lighting lamp 1 is turned on. In addition, the switch S may be opened to allow the current not to flow through the integrated LED converter-plasma generator 40 so that plasma may not be generated from the plasma nozzle 30 while the LED lighting lamp 1 is turned off.

As reviewed through FIGS. 1 and 2, a general LED converter used as a lighting device and a general plasma generator used for sterilization have respective rectification circuits and power conversion circuits. This may increase power consumption so that power efficiency may be reduced.

In addition, even when the rectification circuits and the power conversion circuits are shared for use, it may be difficult to individually use an LED lighting device and a plasma generator, so that operations of an LED lighting device and a sterilizer are inevitably controlled at the same time. This may increase power consumption since the LED lighting device and the sterilizer operate simultaneously even when one of the LED lighting device and the sterilizer is unnecessary, so that power efficiency may be reduced.

In addition, when plasma is generated or emitted, fine dust and organic compounds may be deposited on each electrode, so that a sterilization effect may be reduced.

DISCLOSURE

Technical Problem

An object of the present invention is to provide a control system having a lighting function and a plasma generation function, in which the lighting function and the plasma generation function may be obtained through individual control so that power consumption may be prevented from being increased.

An object of the present invention is to provide a control system having a lighting function and a plasma generation function, in which a plasma wind may be emitted to a space when plasma is generated, and sterilization and deodorization may be performed with emitted plasma.

An object of the present invention is to provide a control system having a lighting function and a plasma generation function, capable of preventing performance of sterilization and deodorization from deteriorating through cleaning of a plasma nozzle.

Technical Solution

According to one embodiment of the present invention, there is provided a control system having a lighting function and a plasma generation function, the control system including: a power conversion unit configured to convert an AC power into a DC power such that a power ripple twice a frequency of a full-wave rectified input power is generated; a lighting control unit configured to control turning on and off of an LED lighting lamp by turn-on/turn-off operations of a transistor electrically connected to the power conversion unit, and keep a current supplied to the LED lighting lamp constant; a photocoupler unit including a first photocoupler electrically connected to the power conversion unit and the lighting control unit to detect a full-wave rectified DC power to turn on the transistor by an on-operation, and a second photocoupler electrically connected to the power conversion unit to detect a full-wave rectified DC power to perform an on-operation; an oscillation frequency generation unit electrically connected to the second photocoupler to generate an oscillation frequency when the second photocoupler performs the on-operation; a plasma electrode configured to receive an amplified high voltage to generate plasma by corona discharge; and a high voltage supply unit electrically connected to the oscillation frequency generation unit to receive the oscillation frequency to induce a high voltage, and amplify the induced high voltage to supply the induced high voltage to the plasma electrode.

In this case, the power conversion unit may be a PWM buck step-down constant current control circuit.

In addition, the lighting control unit may be an NPN transistor.

In addition, a PWM signal may be applied to a base of the transistor to control the LED lighting lamp such that illuminance of the LED lighting lamp varies according to a duty width of the PWM signal.

In addition, the plasma electrode may include: a fixing part having one side that is opened and an opposite side including a suction port configured to suck air, in which a first substrate on which a first positive electrode connector and a first negative electrode connector are formed is mounted in the fixing part; and a fitting part having one side that is opened so as to be fitted to or released from the one side of the fixing part and an opposite side including a discharge port configured to discharge air, in which a second substrate on which a positive electrode, a negative electrode, a second positive electrode connector, and a second negative electrode connector are formed is mounted in the fitting part, and when the one side of the fitting part is fitted to the one side of the fixing part, the first positive electrode connector and the second positive electrode connector may be electrically connected to each other, and the first negative electrode connector and the second negative electrode connector may be electrically connected to each other.

In addition, a first hole and a second hole may be formed on the opposite side of the fixing part, and a first wire having a positive voltage and a second wire having a negative voltage may be connected to the first substrate, the first wire may protrude out of the fixing part through the first hole, and the second wire may protrude out of the fixing part through the second hole.

In addition, the second substrate may extend from an inner space of the fitting part to protrude to the one side of the fitting part such that the negative electrode is located in an inner space of the fixing part.

In addition, the second positive electrode connector may be connected to the positive electrode through a first pattern, and the second negative electrode connector may be connected to the negative electrode through a second pattern.

Advantageous Effects

According to the present invention, a lighting function and a plasma generation function may be obtained through individual control so that power consumption can be prevented from being increased.

According to the present invention, a plasma wind may be emitted to a space when plasma is generated, and sterilization and deodorization can be performed with emitted plasma.

According to the present invention, performance of sterilization and deodorization can be prevented from deteriorating through cleaning of a plasma nozzle.

BEST MODE

Advantages and features of the present invention and methods for achieving the same will be understood more clearly with reference to the following descriptions of embodiments taken in conjunction with the accompanying drawings. However, the present invention may be implemented in various different forms without being limited to the embodiments disclosed below. The embodiments are provided merely so that the disclosure of the present invention will be thorough and complete, and will fully convey the scope of the invention to a person having ordinary skill in the art to which the present invention pertains, and the present invention will be defined only by the scope of the claims.

Figure 1:
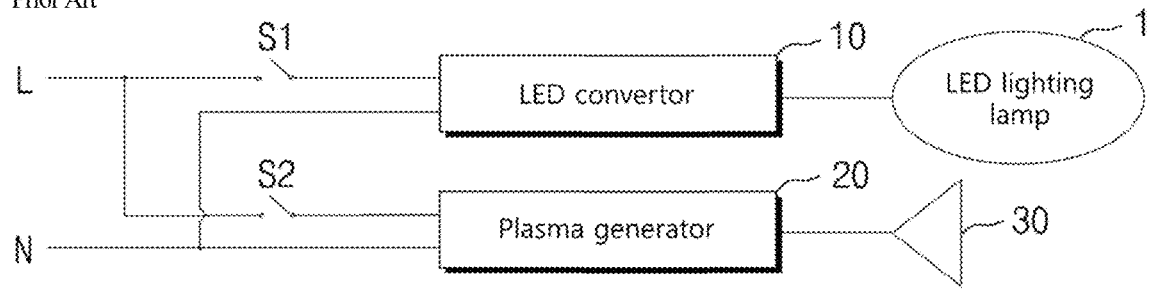
FIG. 1 shows a control system having a lighting function and a plasma generation function according to an individual control scheme according to the related art.
Figure 2:
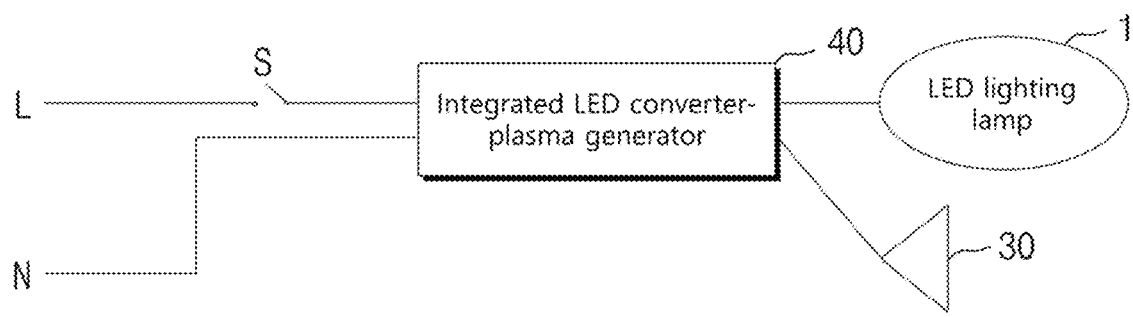
FIG. 2 shows a control system having a lighting function and a plasma generation function according to a mounting scheme according to the related art.
Figure 3:
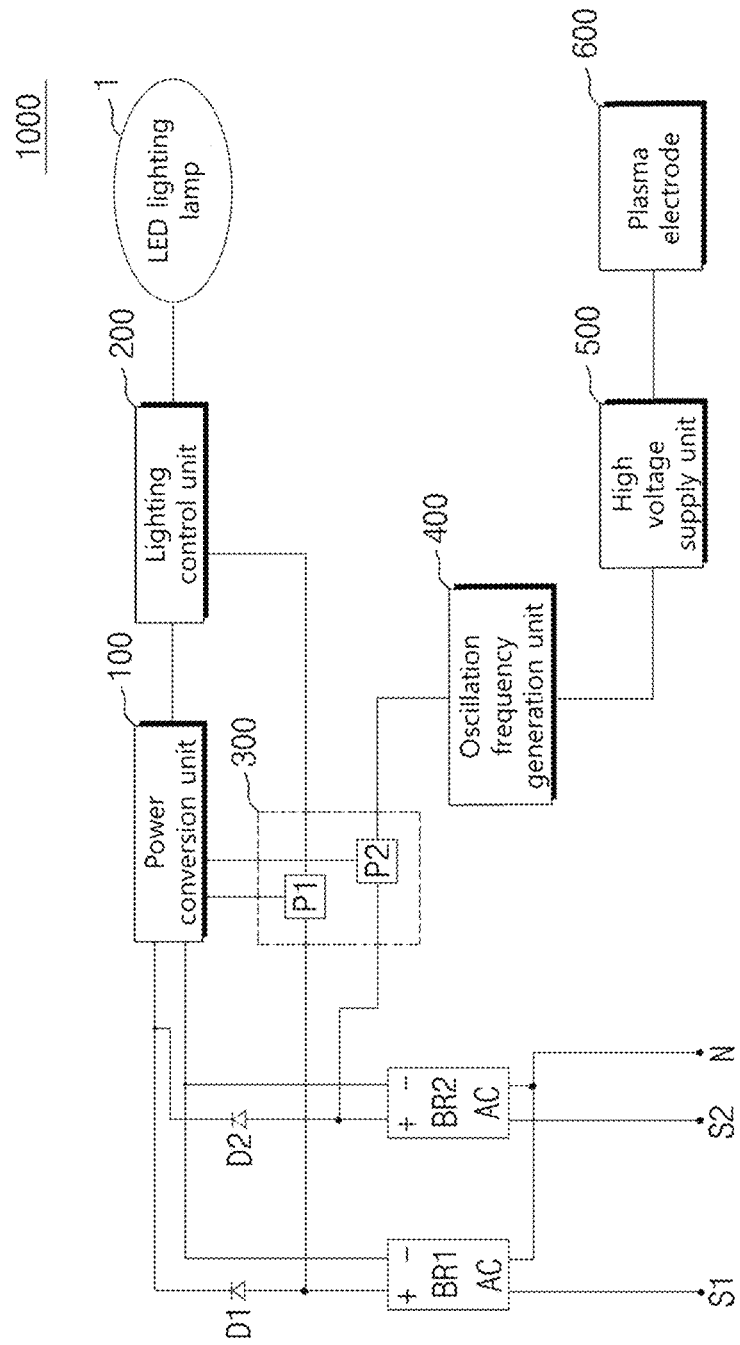
FIG. 3 shows a control system having a lighting function and a plasma generation function according to one embodiment of the present invention.

FIG. 3 shows a control system having a lighting function and a plasma generation function according to one embodiment of the present invention.

Referring to FIG. 3, a control system 1000 having a lighting function and a plasma generation function may include a power conversion unit 100, a lighting control unit 200, a photocoupler unit 300, an oscillation frequency generation unit 400, a high voltage supply unit 500, and a plasma electrode 600.

According to the control system 1000 having the lighting function and the plasma generation function, an AC voltage may be applied so that an alternating current (AC) may flow through bridge diodes BR1 and BR2. The BR1 and BR2 may be electrically connected to the power conversion unit 100 through a diode D1 and a diode D2, respectively. The BR1 may be electrically connected to the power conversion unit 100 and the lighting control unit 200 through a photocoupler P1, and BR2 may be connected to the oscillation frequency generation unit 400 through a photocoupler P2. The P1 and P2 may allow the lighting function and the plasma generation function to be individually controlled. As described above, the lighting function and the plasma generation function may be obtained through individual control so that power consumption may be prevented from being increased.

The power conversion unit 100 may convert an AC power into a direct-current (DC) power such that a power ripple twice a frequency of a full-wave rectified input power may be generated. The power conversion unit 100 may be a switching mode power supply, which is a circuit for an LED lighting device or a DC power supply device, and may be a pulse width modulation (PWM) buck step-down constant current control circuit. The input power may be a commercial power of 50 Hz or 60 Hz.

The switching mode power supply may be a power supply device, which uses a switch control scheme of converting an AC power into a DC power by using a switching transistor or the like. In addition, the switching mode power supply may be a DC stabilization power supply device configured to stabilize an output by controlling an on/off time ratio of a semiconductor switch element, which may have high efficiency, a small size, and a light weight so as to be widely used in most electronic devices and apparatuses.

The lighting control unit 200 may be electrically connected to the power conversion unit 100 to control turning on and off of am LED lighting lamp 1 by turn-on/turn-off operations of a transistor, and keep a current supplied to the LED lighting lamp 1 constant. In other words, the power ripple generated in the power conversion unit 100 may generate a flicker of 100 Hz or 120 Hz in the LED lighting lamp 1, and the lighting control unit 200 may keep the current supplied to the LED lighting lamp 1 constant by the turn-on/turn-off operations of the transistor, so that the power ripple generated in the power conversion unit 100 may be reduced, and the flicker of the LED lighting lamp 1 may be reduced.

The lighting control unit 200 may be an NPN transistor. In this case, in order to keep the current supplied to the LED lighting lamp 1 constant, a voltage may be kept constant at a base of the transistor, so that a collector current may be kept constant even when a magnitude of an emitter current is changed. A PWM signal may be applied to the base of the transistor to control the LED lighting lamp 1 such that illuminance of the LED lighting lamp 1 may vary according to a duty width of the PWM signal.

The photocoupler unit 300 may include: a first photocoupler P1 electrically connected to the power conversion unit 100 and the lighting control unit 200 to detect a full-wave rectified DC power to turn on the transistor by an on-operation; and a second photocoupler P2 electrically connected to the power conversion unit 100 to detect a full-wave rectified DC power to perform an on-operation.

The oscillation frequency generation unit 400 may be electrically connected to the second photocoupler P2 to generate an oscillation frequency when the second photocoupler P2 performs the on-operation.

The high voltage supply unit 500 may be electrically connected to the oscillation frequency generation unit 400 to receive the oscillation frequency to induce a high voltage, and amplify the induced high voltage to supply the induced high voltage to the plasma electrode 600. For example, when the oscillation frequency generation unit 400 generates an oscillation frequency of 50 kHz, the oscillation frequency may be transmitted to a primary side of a high voltage generation transformer, and a high voltage of about 500 V/50 kHz may be induced in a secondary side of the high voltage generation transformer. In addition, the induced high voltage may be subjected to quaternary voltage multiplication amplification so that about 6000 Vdc/5 mA may be supplied to the plasma electrode 600.

The plasma electrode 600 may receive an amplified high voltage to generate plasma by corona discharge. In detail, the plasma electrode 600 may generate minute corona discharge through a negative electrode (−) and a positive electrode (+), in which a negative charge may move from the negative electrode (−) having a sharp needle shape to the positive electrode (+) having a wide plate shape when the discharge starts. In this way, a plasma wind of maximum 2 m/sec may be generated.

Figure 4:
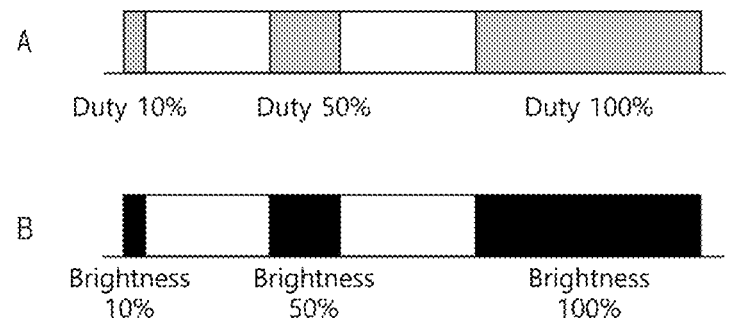
FIG. 4 is a schematic view showing brightness of an LED lighting lamp according to a PWM signal according to one embodiment of the present invention.

FIG. 4 is a schematic view showing brightness of an LED lighting lamp according to a PWM signal according to one embodiment of the present invention.

Referring to FIGS. 3 and 4, it may be found that brightness (B) of the LED lighting lamp when a PWM signal of 5 V is applied to the base of the transistor varies according to a duty width (A) of the PWM signal.

The brightness (B) of the LED lighting lamp may be controlled from 0% to 100%, and the collector current of the transistor may vary according to the duty width (A) of the PWM signal so that the brightness (B) of the LED lighting lamp may vary.

For example, when a plasma generation amount is 50%, an operation of generating plasma for 10 seconds and performing a pause for 10 seconds may be repeatedly performed so that the plasma generation amount may be reduced to 50%. The reason why the plasma generation amount is controlled to be greater than or equal to 50% is that a sterilization effect and the like may be significantly reduced when the plasma generation amount is less than 50%.

In addition, when the plasma generation amount is 100%, the plasma electrode 600 may continuously generate the plasma without a pause time.

Figure 5:
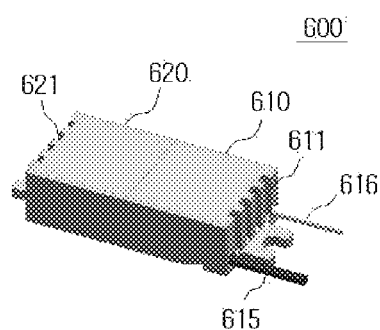
FIG. 5 is a perspective view showing a plasma electrode according to one embodiment of the present invention.
Figure 6:
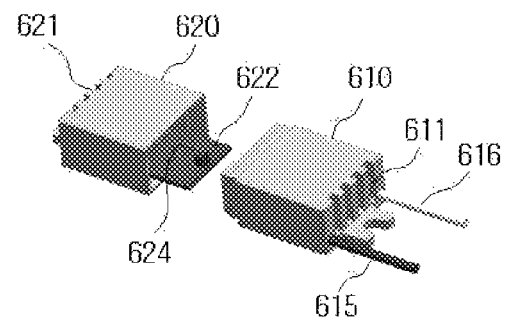
FIG. 6 is an exploded perspective view showing the plasma electrode according to one embodiment of the present invention.
Figure 7:
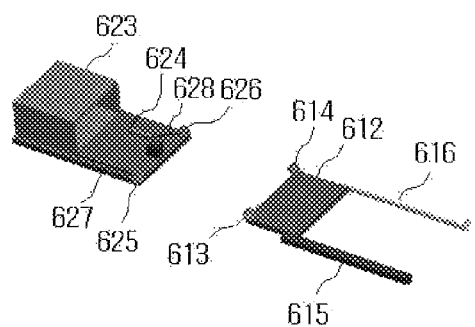
FIG. 7 is an exploded perspective view showing an inside of the plasma electrode, which shows a structure for electrically connecting an electrode of a fixing part to an electrode of a fitting part according to one embodiment of the present invention.
Figure 8:
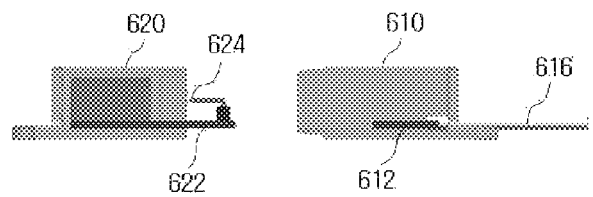
FIG. 8 is an exploded sectional view showing sections of the fixing part and the fitting part according to one embodiment of the present invention.

FIG. 5 is a perspective view showing a plasma electrode according to one embodiment of the present invention. FIG. 6 is exploded perspective view showing the plasma electrode an according to one embodiment of the present invention. FIG. 7 is an exploded perspective view showing an inside of the plasma electrode, which shows a structure for electrically connecting an electrode of a fixing part to an electrode of a fitting part according to one embodiment of the present invention. FIG. 8 is an exploded sectional view showing sections of the fixing part and the fitting part according to one embodiment of the present invention.

Referring to FIGS. 3 and 5 to 8, the plasma electrode 600 may include a fixing part 610 and a fitting part 620.

The fixing part 610 may have one side that is opened and an opposite side including a suction port 611 configured to suck air, in which the suction port 611 may have a plurality of grooves that are opened and formed at equidistant intervals so that air may be sucked uniformly. The grooves may be formed in a vertical direction, and a shape of the groove and the number of the grooves are not restricted.

In addition, the opposite side of the fixing part 610 may have a plurality of steps so that the fitting part 620 may be fitted.

In addition, a first substrate 612 on which a first positive electrode connector 613 and a first negative electrode connector 614 are formed may be mounted in the fixing part 610. When the first substrate 612 has a quadrangular plane shape, the first positive electrode connector 613 and the first negative electrode connector 614 may be disposed at corners of one side of the first substrate 612, but are not limited thereto.

The fitting part 620 may have one side that is opened so as to be fitted to or released from the one side of the fixing part 610 and an opposite side including a discharge port 621 configured to discharge air, in which similar to the suction port 611 described above, the discharge port 621 may have a plurality of grooves that are opened and formed at equidistant intervals so that air may be discharged uniformly. The grooves may be formed in the vertical direction, and a shape of the groove and the number of the grooves are not restricted.

As described above, the plasma wind may be emitted to a space when the plasma is generated, and sterilization and deodorization may be performed with the emitted plasma. The plasma wind may be directed from the opposite side of the fixing part 610 to the opposite side of the fitting part 620.

In addition, a second substrate 622 on which a positive electrode 623, a negative electrode 624, a second positive electrode connector 625, and a second negative electrode connector 626 are formed may be mounted in the fitting part 620. When the second substrate 622 has a quadrangular plane shape, the second positive electrode connector 625 and the second negative electrode connector 626 may be disposed at corners of one side of the second substrate 622, but are not limited thereto. In addition, the positive electrode 623 may be disposed on an opposite side of the second substrate 622, but is not limited thereto. The negative electrode 624 may be disposed on the one side of the second substrate 622, but is not limited thereto.

When the one side of the fitting part 620 is fitted to the one side of the fixing part 610, the first positive electrode connector 613 and the second positive electrode connector 625 may be electrically connected to each other, and the first negative electrode connector 614 and the second negative electrode connector 626 may be electrically connected to each other. In this case, the first positive electrode connector 613 and the first negative electrode connector 614 may be male connectors, and the second positive electrode connector 625 and the second negative electrode connector 626 may be female connectors, and vice versa.

In addition, a first hole and a second hole may be formed on a flange part of the fixing part 610 on the opposite side of the fixing part 610, and a first wire 615 having a positive voltage and a second wire 616 having a negative voltage may be connected to the first substrate 612. The first wire 615 may protrude out of the fixing part 610 through the first hole, and the second wire 616 may protrude out of the fixing part 610 through the second hole. The first wire 615 may be supplied with a positive voltage so as to be displayed in red, and the second wire 616 may be supplied with a negative voltage so as to be displayed in black.

In addition, the second substrate 622 may extend from an inner space of the fitting part 620 to protrude to the one side of the fitting part 620 such that the negative electrode 624 may be located in an inner space of the fixing part 610. In this case, one end of the second substrate 622 may be located in the inner space of the fixing part 610. For this reason, when the one side of the fitting part 620 is released from the one side of the fixing part 610, the negative electrode 624 and an inner portion of the fixing part may be easily cleaned. Furthermore, performance of sterilization and deodorization may be prevented from deteriorating through cleaning of a plasma nozzle.

In addition, the second positive electrode connector 625 may be connected to the positive electrode 623 through a first pattern 627, and the second negative electrode connector 626 may be connected to the negative electrode 624 through a second pattern 628.

Although the embodiments of the present invention have been described above with reference to the embodiments shown in the drawings to facilitate understanding, the embodiments have been provided for illustrative purposes only, and it will be understood by those skilled in the art that various modifications and other equivalent embodiments can be made from the embodiments. Therefore, the genuine technical scope of the present invention shall be determined by the appended claims.

The invention claimed is:

1. A control system having a lighting function and a plasma generation function, the control system comprising:
   a power conversion unit configured to convert an AC power into a DC power such that a power ripple twice a frequency of a full-wave rectified input power is generated;
   a lighting control unit configured to control turning on and off of an LED lighting lamp by turn-on/turn-off operations of a transistor electrically connected to the power conversion unit, and keep a current supplied to the LED lighting lamp constant;
   a photocoupler unit including a first photocoupler electrically connected to the power conversion unit and the lighting control unit to detect a full-wave rectified DC power to turn on the transistor by an on-operation, and a second photocoupler electrically connected to the power conversion unit to detect a full-wave rectified DC power to perform an on-operation;
   an oscillation frequency generation unit electrically connected to the second photocoupler to generate an oscillation frequency when the second photocoupler performs the on-operation;
   a plasma electrode configured to receive an amplified high voltage to generate plasma by corona discharge; and
   a high voltage supply unit electrically connected to the oscillation frequency generation unit to receive the oscillation frequency to induce a high voltage, and amplify the induced high voltage to supply the induced high voltage to the plasma electrode.

2. The control system of claim 1, wherein the power conversion unit is a PWM buck step-down constant current control circuit.

3. The control system of claim 1, wherein the lighting control unit is an NPN transistor.

4. The control system of claim 1, wherein a PWM signal is applied to a base of the transistor to control the LED lighting lamp such that illuminance of the LED lighting lamp varies according to a duty width of the PWM signal.

5. The control system of claim 1, wherein the plasma electrode includes:
   a fixing part having one side that is opened and an opposite side including a suction port configured to suck air, in which a first substrate on which a first positive electrode connector and a first negative electrode connector are formed is mounted in the fixing part; and
   a fitting part having one side that is opened so as to be fitted to or released from the one side of the fixing part and an opposite side including a discharge port configured to discharge air, in which a second substrate on which a positive electrode, a negative electrode, a second positive electrode connector, and a second negative electrode connector are formed is mounted in the fitting part, and
   when the one side of the fitting part is fitted to the one side of the fixing part, the first positive electrode connector and the second positive electrode connector are electrically connected to each other, and the first negative electrode connector and the second negative electrode connector are electrically connected to each other.

6. The control system of claim 5, wherein a first hole and a second hole are formed on the opposite side of the fixing part, and
   a first wire having a positive voltage and a second wire having a negative voltage are connected to the first substrate, the first wire protrudes out of the fixing part through the first hole, and the second wire protrudes out of the fixing part through the second hole.

7. The control system of claim 5, wherein the second substrate extends from an inner space of the fitting part to protrude to the one side of the fitting part such that the negative electrode is located in an inner space of the fixing part.

8. The control system of claim 5, wherein the second positive electrode connector is connected to the positive electrode through a first pattern, and the second negative electrode connector is connected to the negative electrode through a second pattern.

* * * * *